United States Patent [19]
Hu et al.

[11] Patent Number: 5,698,644
[45] Date of Patent: Dec. 16, 1997

[54] PROCESS FOR PREPARING SYNDIOTACTIC VINYL AROMATIC POLYMERS UNDER HIGH PRESSURE INERT GAS

[75] Inventors: Andrew Teh Hu; Hong-Ji Lee; Tein-Sone Chen, all of Hsinchu, Taiwan

[73] Assignee: National Science Council, Taipei, Taiwan

[21] Appl. No.: 789,654

[22] Filed: Jan. 27, 1997

[51] Int. Cl.⁶ ............................... C08F 4/642; C08F 2/34
[52] U.S. Cl. .................. 526/160; 526/161; 526/347.2
[58] Field of Search ................................ 526/160, 170, 526/941, 161, 347.2

[56] References Cited

U.S. PATENT DOCUMENTS 5,484,862  1/1996  Siddall et al. ..................... 526/346 X

OTHER PUBLICATIONS

Ishihara et al., "Crystalline Syndiotactic Polystyrene", Maromolecules 19:2464–2465, 1986.

Ishihara et al., "Stereospecific Polymerization of Styrene Giving the Syndiotactic Polymer", Maromolecules 21:3356–3360, 1988.

Primary Examiner—Fred Teskin
Attorney, Agent, or Firm—Fish & Richardson P.C.

[57] ABSTRACT

Syndiotactic polymers of vinyl aromatic monomers are synthesized in the presence of a catalytic system consisting of a commercial titanium compound and methylaluminoxane under high pressure and/or supercritical state of inert gas such as argon or nitrogen.

5 Claims, No Drawings

PROCESS FOR PREPARING SYNDIOTACTIC VINYL AROMATIC POLYMERS UNDER HIGH PRESSURE INERT GAS

FIELD OF THE INVENTION

The present invention relates to a process for polymerizing vinyl aromatic monomers, particularly styrene, in the presence of a catalyst system consisting essentially of a commercial titanium compound and methylaluminoxane to produce syndiotactic polymers under high pressure and/or supercritical state of an inert gas.

BACKGROUND OF THE INVENTION

In 1986, N. Ishihara, T. Seimiga, M. Kuramoto, and M. Uoi [Macromolecules, 19, pp. 2464–2465(1986)] disclosed that catalyst system consisting of Ti compound and methylaluminoxane can be used to synthesize syndiotactic polystyrene. The polymerization will give different product yield, different average molecular weight, and polydispersity under different reaction conditions [e.g. reaction temperature, catalyst/cocatalyst molar ratio (Al/Ti), and monomer/catalysts ratio, etc.]. The major factor affecting the syndiotacticity of polystyrene is the catalyst, which is known to be the Ziegler-Natta type consisting of Ti(IV) and Ti(III) as disclosed by N. Ishihara et al. in Macromolecules, 21, pp. 3356–3360, EP 210,615, and EP 224,096. However, polymerization using Ziegler-Natta catalyst usually takes place at relatively low temperature and atmospheric pressure, as reported in U.S. Pat. No. 5,066,741, U.S. Pat. No. 5,206,197, and WO 88/10275 where the synthesis of syndiotactic polystyrene took place at near atmospheric pressure.

Generally, toluene is the most common solvent for preparation of the syndiotactic polystyrene, but it also acts as a chain transfer agent to lower the propagation rate during the polymerization.

SUMMARY OF THE INVENTION

The present invention discloses a process for preparing syndiotactic vinyl aromatic polymers comprising polymerizing vinyl aromatic monomers in the presence of a catalyst system consisting essentially of TiCpXYZ and methylaluminoxane, wherein Cp is cyclopentadienyl, X, Y and Z are independently halogen, —OR or —NR$_2$, wherein R is aliphatic, cycloaliphatic or aromatic hydrocarbon having 1–12 carbon atoms; and under a high pressure inert gas having a pressure higher than 500 psia.

We believe that high pressure favors the polymerization process of the present invention, based on the transition-state theory of binary collision, where the reaction rate will increase with the increasing pressure. Thus a major objective of this invention is to synthesize syndiotactic vinyl aromatic polymers with good yield.

Another objective of this invention is to synthesize syndiotactic vinyl aromatic polymers without the drawbacks of using toluene as a solvent in the prior art syndiotactic vinyl aromatic polymerization reaction. Therefore, an inert gas under high pressure and/or at supercritical state has been adopted as the inert solvent in the high pressure process of the present invention.

A suitable gas for use in the high pressure process of the present invention includes (but not limited to) N$_2$, He, Ne, Ar, and Kr.

DETAILED DESCRIPTION OF THE INVENTION

The present invention is related to a process for polymerizing vinyl aromatic monomers in the presence of a catalyst system consisting essentially of a titanium compound and methylaluminoxane to produce syndiotactic polymers under high pressure and/or supercritical state of an inert gas.

The vinyl aromatic polymers prepared in the present invention have a repeating unit as represented by the general formula (I):

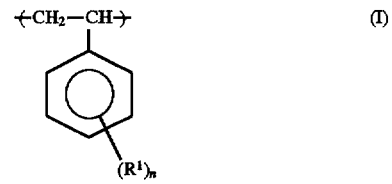

where R$^1$ represents a hydrogen atom, a halogen atom or a substituent containing a carbon atom, an oxygen atom, a nitrogen atom, a sulfur atom, a phosphorus atom or a silicon atom, and n represents an integer of 1 to 5. Preferably, R$^1$ is hydrogen, methyl or ethyl; and n is 1. More preferably, R$^1$ is hydrogen.

In the process of the present invention, the polymerization reaction is ideally carried out in a supercritical fluid of an inert gas and free of any organic solvent, which acts as a reactive media. However, the catalyst system used in the process of the present invention is unstable and readily oxidized in the atmosphere, and thus is available in the form of a solution. Nevertheless, a minimum amount of organic solvent for the catalyst system should be used according to the spirit of the present invention. The inert gas used in the process of the present invention in principle has a pressure high enough to reach its supercritical state, and thus its pressure depends on the inert gas itself which may range from the atmosphereic pressure (1.013×10$^5$ N/m$^2$ [14.7 psi]) to 3.447×10$^7$ N/m$^2$ [5000 psi]. When the reaction pressure and temperature reach the critical point of an inert gas (N$_2$: Tc=−147° C. [126.2 K], Pc=3.389×10$^6$ N/m$^2$ [491.7 psi]; He: Tc=−269.9° C.[3.31 K], Pc=1.139×10$^5$ N/m$^2$ [16.53 psi]; Ne: Tc=−228.8° C. [44.4 K], Pc=2.759×10$^6$ N/m$^2$ [400.3 psi]; Ar: Tc=−122.4° C.[150.8 K], Pc=4.869×10$^6$ N/m$^2$ [706.3 psi]; Kr: Tc=−63.8° C. [209.4 K], Pc=5.499× 10$^6$ N/m$^2$ [797.7 psi]), the inert gas will turn to be supercritical fluid and becomes part of reaction media.

The titanium compound used in the process of the present invention preferably have a formula of TiCpXYZ, wherein Cp is cyclopentadienyl, X, Y and Z are independently halogen, —OR or —NR$_2$, wherein R is aliphatic, cycloaliphatic or aromatic hydrocarbon having 1–12 carbon atoms. The titanium compound is commercially available and may be prepared according to any prior art technique. In the following examples of the present invention, the titanium compound used was cyclopentadienyltitanium trichloride.

The methylaluminoxane used in the process of the present invention may be prepared according to any known technique such as disclosed by Kaminsky in U.S. Pat. No. 4,544,762 or by Ishihara in EPO 210,615. In the following examples of the present invention, the methylaluminoxane was supplied by Aldrich Chem. Co..

The molar ratio of catalyst/cocatalyst (Ti/Al) may range from 1:50 to 1:10,000. However, the preferably molar ratio is from 1:250 to 1:5000.

The molar ratio of vinyl aromatic monomer to the catalyst system (in terms of Ti) may range from 100:1 to 5,000,000:1, preferably from 4,000:1 to 500,000:1.

The polymerization is conducted at temperatures of from 25° C. to 100° C., preferably from 30° C. to 80° C., for a time sufficient to produce the desired polymer. Typical reaction time is from 5 minutes to several hours. As the present invention emphasizes on product yield, the preference time is 5 minutes to 1 hour.

Suitable vinyl aromatic monomers which can be polymerized in the process of the present invention include those represented by the formula (II):

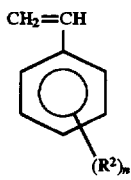

(II)

wherein each $R^2$ is independently hydrogen, an aliphatic or cycloaliphatic hydrocarbon group with 1 to 12 carbon atoms, for example styrene, n-butyl styrene, and t-butyl styrene, etc., with styrene being especially suitable.

Suitable techniques such as devolitilization at reduced pressures, contacting with molecular sieves or high surface area alumina, deaeration, etc. has been adopted to purify the styrene monomer before the polymerization. In the present invention, polymerization grade styrene monomer was purified by being passed through a column of anhydrous $Al_2O_3$.

In the following, the present invention will be described in more detail with reference to the examples and comparative examples. The examples are only meant to illustrate the invention, but not to limit it.

EXAMPLE 1

Polymerization experiment was performed batch-wise in a stirred autoclave. The autoclave reactor had a capacity of 300 ml and was designed for a maximum $6.893 \times 10^7$ N/m$^2$ [10,000 psi] and temperature up to 300° C. It was equipped with a running agitator and a magnet drive. To synthesize the syndiotactic polystyrene the autoclave reactor was first degassed and filled up with argon gas to replace air. Subsequently 100 g of styrene and $2.4 \times 10^{-5}$ mole of CpTiCl$_3$ (dissolved in 4.7 ml of toluene) and $2.4 \times 10^2$ mole of methylaluminoxane (MAO) (dissolved in 16 ml of toluene) were introduced into the autoclave under argon atmosphere at assigned temperature 40° C. The reaction pressure was adjusted to $6.893 \times 10^6$ N/m$^2$ [1000 psi] when the CpTiCl$_3$ was injected together with the MAO to start the polymerization. After 1 hour, the pressure was released, and the polymerization reaction was stopped by the addition of acidified methanol. The resulting polymer was washed several times with 500 ml of methanol and vacuum dried at 50° C. for 24 hours. The yield of polystyrene is 30.82 g which contain 73% of polystyrene with syndiaotacticity higher than 87%. The compound was extracted with boiling methyl ethyl ketone for 8 hours, and the methyl ethyl ketone-insoluble polystyrene had a melting point of 253° C., a Tg of 99° C., and weight average molecular weight of 155,441, with >99% syndiotacticity by $^{13}$C-NMR analysis. Results are summarized in Table I.

EXAMPLES 2–20

The reaction procedures of Example 1 are substantially repeated except at different molar ratios of titanium complex, reaction temperatures and reaction pressures as listed in Table I. Results are summarized in Table I.

COMPARATIVE EXAMPLES 1–2

The reaction procedures under similar conditions as described in Example 1 except under atmospheric pressure and reaction temperature. Results are included in Table I. Please note the product yield is relatively low in these two examples in comparison with the Examples 7, 9–12.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

TABLE I

| EXAMPLE | MOLAR RATIO Styrene:Al:Ti | PRESSURE N/m$^2$/[psi] | TEMP °C. | TIME min | YIELD g | INSOLUBLE IN MEK % | Mw | Tm °C. |
|---|---|---|---|---|---|---|---|---|
| 1 | 40,000:1,000:1$^a$ | 6.893 × 10$^6$/[1000] | 40 | 60 | 30.82 | 73 | 155,441 | 253 |
| 2 | 40,000:1,000:1$^a$ | 6.893 × 10$^6$/[1000] | 40 | 30 | 31.17 | 65 | — | 252 |
| 3 | 40,000:1,000:1$^a$ | 6.893 × 10$^6$/[1000] | 40 | 20 | 26.45 | 70 | — | 252 |
| 4 | 40,000:1,000:1$^a$ | 6.893 × 10$^6$/[1000] | 70 | 60 | 21.72 | 80 | 48,087 | 251 |
| 5 | 40,000:1,000:1$^a$ | 6.893 × 10$^6$/[1000] | 70 | 30 | 18.41 | 75 | 41,211 | 253 |
| 6 | 40,000:1,000:1$^a$ | 6.893 × 10$^6$/[1000] | 70 | 15 | 17.72 | 68 | — | 254 |
| 7 | 40,000:1,000:1$^a$ | 6.893 × 10$^6$/[1000] | 70 | 10 | 16.81 | 62 | — | 252 |
| 8 | 40,000:1,000:1$^a$ | 6.893 × 10$^6$/[1000] | 70 | 5 | 16.35 | 65 | 37,690 | 251 |
| 9 | 40,000:1,000:1$^a$ | 1.034 × 10$^7$/[1500] | 70 | 60 | 26.93 | 76 | 52,522 | 252 |
| 10 | 40,000:1,000:1$^a$ | 8.961 × 10$^6$/[1300] | 70 | 60 | 24.67 | 78 | 49,601 | 250 |
| 11 | 40,000:1,000:1$^a$ | 5.17 × 10$^6$/[750] | 70 | 60 | 25.10 | 61 | — | 250 |
| 12 | 40,000:1,000:1$^a$ | 3.447 × 10$^6$/[500] | 70 | 60 | 24.8 | 60 | — | 254 |
| 13 | 40,000:1,000:1$^a$ | 6.893 × 10$^6$/[1000] | 80 | 60 | 32.76 | 61 | 30,795 | 251 |
| 14 | 40,000:1,000:1$^a$ | 6.893 × 10$^6$/[1000] | 90 | 60 | 8.93 | 63 | — | 251 |
| 15 | 40,000:1,000:1$^a$ | 6.893 × 10$^6$/[1000] | 60 | 60 | 22.98 | 65 | — | 253 |
| 16 | 40,000:2,000:1$^b$ | 6.893 × 10$^6$/[1000] | 70 | 60 | 25.51 | 75 | — | 249 |
| 17 | 40,000:500:1$^c$ | 6.893 × 10$^6$/[1000] | 70 | 60 | 34.5 | 50 | — | 252 |
| 18 | 40,000:250:1$^d$ | 6.893 × 10$^6$/[1000] | 70 | 60 | 6.98 | 38 | — | 253 |
| 19 | 40,000:250:1$^d$ | 6.893 × 10$^6$/[1000] | 70 | 240 | 12.17 | 33 | — | 253 |
| 20 | 20,000:1,000:1$^e$ | 6.893 × 10$^6$/[1000] | 70 | 60 | 48.9 | 85 | — | 251 |
| Comparative 1 | 40,000:1,000:1$^a$ | 1.013 × 10$^5$/[14.7] | 70 | 10 | 8.69 | 90 | — | 254 |
| Comparative 2 | 40,000:1,000:1$^a$ | 1.013 × 10$^5$/[14.7] | 70 | 60 | 10.75 | 89 | — | 254 |

$^a$Styrene = 100 g (0.96 mole) - CpTiCl3 = 2.4 × 10$^{-5}$ mole/in 4.7 ml of toluene - MAO = 2.4 × 10$^{-2}$ mole/in 16 ml of toluene
$^b$Styrene = 100 g (0.96 mole) - CpTiCl3 = 2.4 × 10$^{-5}$ mole/in 4.7 ml of toluene - MAO = 4.8 × 10$^{-2}$ mole/in 32 ml of toluene
$^c$Styrene = 100 g (0.96 mole) - CpTiCl3 = 2.4 × 10$^{-5}$ mole/in 4.7 ml of toluene - MAO = 1.2 × 10$^{-2}$ mole/in 8 ml of toluene
$^d$Styrene = 100 g (0.96 mole) - CpTiCl3 = 2.4 × 10$^{-5}$ mole/in 4.7 ml of toluene - MAO = 6 × 10$^{-3}$ mole/in 4 ml of toluene
$^e$Styrene = 100 g (0.96 mole) - CpTiCl3 = 4.8 × 10$^{-5}$ mole/in 4.7 ml of toluene - MAO = 4.8 × 10$^{-2}$ mole/in 16 ml of toluene

We claim:

1. A process for preparing syndiotactic vinyl aromatic polymers comprising polymerizing vinyl aromatic monomers in the presence of a catalytic system consisting essentially of TiCpXYZ and methylaluminoxane, wherein Cp is cyclopentadienyl, X, Y and Z are independently halogen, —OR or —$NR_2$, wherein R is aliphatic, cycloaliphatic or aromatic hydrocarbon having 1–12 carbon atoms; and under a high pressure inert gas having a pressure higher than 500 psia.

2. The process according to claim 1, wherein said inert gas is selected from the group consisting of $N_2$, He, Ne, Ar, and Kr.

3. The process according to claim 1, wherein said inert gas is a supercritical fluid.

4. The process according to claim 1, wherein a molar ratio or said vinyl aromatic monomer to said catalyst system (in terms of Ti) ranges from 4,000:1 to 500,000:1.

5. The process according to claim 1, wherein the polymerization is conducted at a temperature from 25° C. to 100° C.

* * * * *